United States Patent [19]

Matsumoto

[11] 4,165,560
[45] Aug. 28, 1979

[54] METHOD FOR MANUFACTURING A DIAMOND STYLUS FOR VIDEO DISC PLAYERS

[75] Inventor: Yasushi Matsumoto, Narashino, Japan

[73] Assignee: RCA Corporation, New York, N.Y.

[21] Appl. No.: 830,028

[22] Filed: Sep. 2, 1977

[30] Foreign Application Priority Data

Sep. 13, 1976 [GB] United Kingdom ............... 37852/76

[51] Int. Cl.² .......................... G11B 3/70; G11B 3/44; H04N 5/76
[52] U.S. Cl. ............... 29/630 R; 29/592 R; 29/558; 274/38; 179/100.41 G
[58] Field of Search ............ 29/630 R, 558, 592; 179/100.41 G, 100.1 B; 358/128; 274/38

[56] References Cited

U.S. PATENT DOCUMENTS

| 1,966,873 | 7/1934 | Sochor | 274/38 |
| 2,530,284 | 11/1950 | Capps et al. | 274/38 |
| 2,544,495 | 3/1951 | Franz | 274/38 |
| 2,572,426 | 10/1951 | Andrews | 179/100.41 R |
| 3,184,242 | 5/1965 | Marcucci | 274/38 |
| 3,774,918 | 11/1973 | Shibata | 274/38 |
| 3,842,194 | 10/1974 | Clemens | 179/100.1 B |
| 3,871,664 | 3/1975 | Hughes | 274/38 |
| 4,031,546 | 6/1977 | Leedom | 274/38 |

*Primary Examiner*—Francis S. Husar
*Assistant Examiner*—Daniel C. Crane
*Attorney, Agent, or Firm*—William H. Meagher; Dilip A. Kulkarni

[57] ABSTRACT

A method of manufacturing a stylus by modifying a square post shaped diamond element is disclosed. A tip having a conical surface is ground at one end of the diamond element. An electrode bearing surface is formed in the region of the tip such that the angle subtended by the electrode bearing surface with the axis of the element is not less than the angle included between the conical surface and the axis. A record engaging surface substantially orthogonal to the electrode bearing surface is formed in the tip region such that the two surfaces intersect along a line substantially perpendicular to the stylus axis. A thin layer of conductive material is deposited on the electrode bearing surface to form a stylus electrode.

13 Claims, 14 Drawing Figures

4,165,560

METHOD FOR MANUFACTURING A DIAMOND STYLUS FOR VIDEO DISC PLAYERS

The present invention relates to a novel system suitable for playback of high density information records, such as video discs, and to a method for forming a novel diamond stylus advantageous for use in such playback systems.

In U.S. Pat. No. 3,842,194 issued on Oct. 15, 1974 to Jon K. Clemens, a video playback system of a variable capacitance form is disclosed. In one configuration of the Clemens system, information, representative of recorded picture and sound, is encoded in a relatively fine spiral groove on the surface of a disc record (e.g., groove width - 3.5 micrometers, groove depth - 1.0 micrometer). The record substrate is covered with a coating of conductive material and a dielectric layer overlying the conductive coating. During playback, a pickup stylus, having a thin conductive electrode (e.g., about 0.1250 micrometers deep), engages the groove as the record is rotated by a supportive turntable. Capacitive variations exhibited between the stylus electrode and the conductive coating are sensed to recover the prerecorded information.

In an illustrative form of stylus for practicing the Clemens invention, the stylus comprises a support element formed of sapphire with a shaped tip defined by a prow, V-shaped electrode bearing rear surface remote from the prow, a record engaging surface extending from the bottom edge of the rear surface and a pair of side surfaces extending from the side edges of the rear surface and converging at the prow. The intersection of the rear and the side surfaces with the record engaging surface forms, for example, a triangular footprint. Illustratively, the angle included between the side edges is equal to 42°, the length of the bottom edge is about 2 micrometers, the height of the triangular footprint is about 4 micrometers and the angle between the prow and the rear surface is about 50° to 65°. The rear surface of the sapphire support element is coated with a thin layer of conductive material (for example, about 0.1250 micrometers deep) to form a stylus electrode.

The use of diamond in place of sapphire for the support element of the stylus can be expected to increase the life of the stylus. However, the processing of a diamond stylus to provide desired structure is attended with difficulties owing to the shape requirements of the tip, tiny physical dimensions and high hardness of the diamond.

It is known to form a stylus of the above-described shape by successively grinding various tip defining surfaces of the diamond support element. By this technique, however, the edge areas of the diamond stylus cannot be quickly finished because various surfaces of the diamond support element must successively be kept in contact with the grinding plate for relatively long periods. Such a processing technique, therefore, has disadvantages in manufacturing cost.

A new system has been conceived, which results in a novel and advantageous stylus shape, and provides a convenient stylus manufacturing method, applicable to diamond stylus formation. In the new system, a conical surface is formed at one end of a square post shaped diamond support element. A first flat surface is then lapped in the tip region of the diamond support element such that the angle subtended by the first flat surface with the stylus axis is not less than the angle included between the conical surface and the stylus axis. A record engaging surface substantially orthogonal to the first flat surface is then formed in the tip region such that the two surfaces intersect each other along a line perpendicular to the stylus axis.

Pursuant to a feature of the invention, a pair of converging surfaces are formed in the tip region such that the intersection of the converging surfaces with the record engaging surface defines the sides of a stylus footprint disposed in the plane of the record engaging surface and the intersection of the converging surfaces with the conical surface defines a prow remote from the first flat surface.

Figure 8:
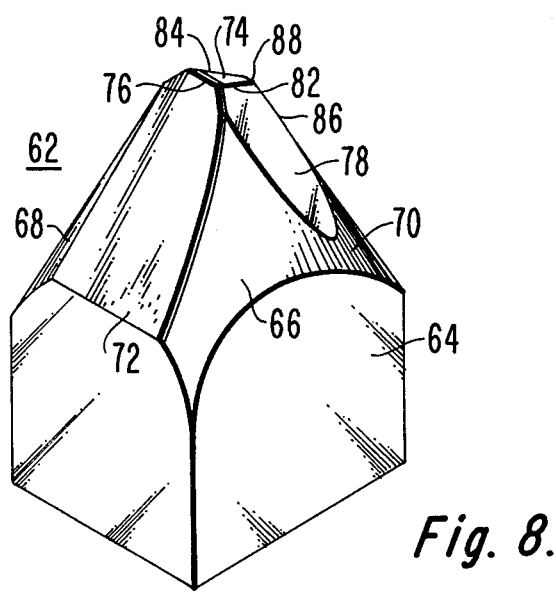

FIG. 8 shows the tip region of the novel pickup stylus of FIGS. 1, 2 and 4–7 in perspective; and FIGS. 9–11 and 9(a)–11(a) illustrate the sequence involved in shaping a square post shaped diamond support element to form a novel stylus of FIGS. 1, 2 and 4–8.

Figure 1:
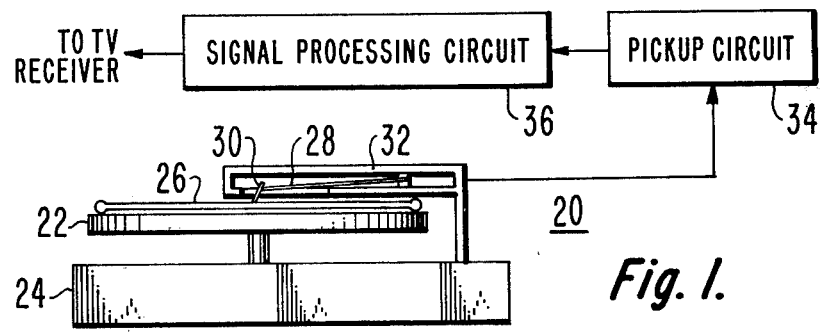
FIG. 1 illustrates a video disc system for playing back prerecorded signals recorded in a disc record track of a given width in which a novel pickup stylus constructed in accordance with the present invention may be advantageously employed.
Figure 2:
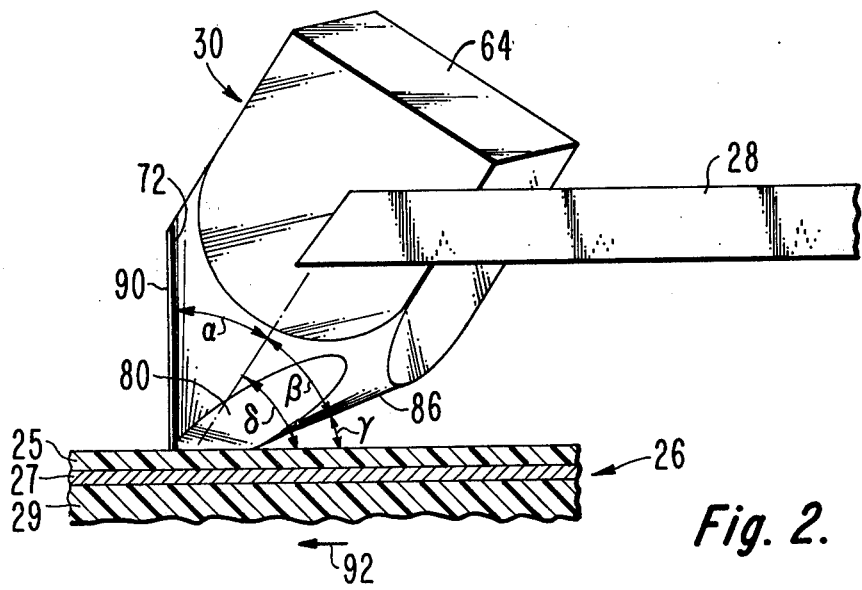
FIG. 2 represents a portion of the video disc system of FIG. 1 perspectively showing, in a greatly exaggerated form, the novel pickup stylus, secured to a stylus arm, riding in the disc record track.
Figure 4:
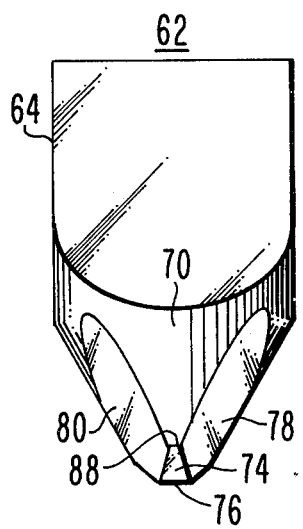
FIGS. 4, 5, 6 and 7 illustrate, respectively, the rear view, the end view, the front view and the bottom view of the novel pickup stylus of FIGS. 1 and 2.
Figure 5:
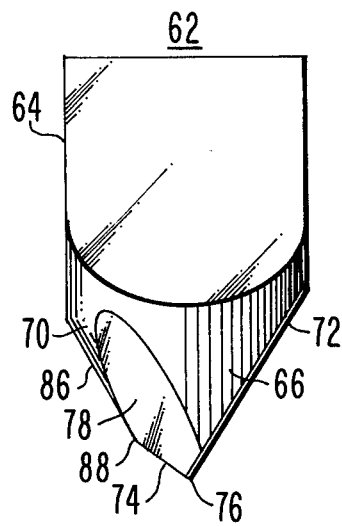
Figure 6:
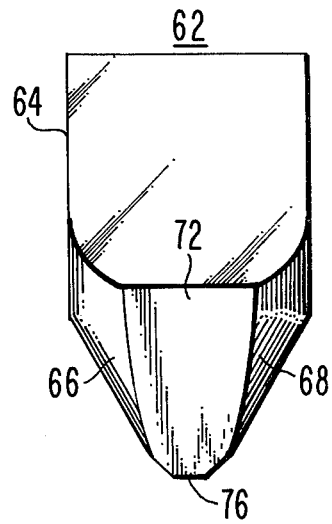
Figure 7:
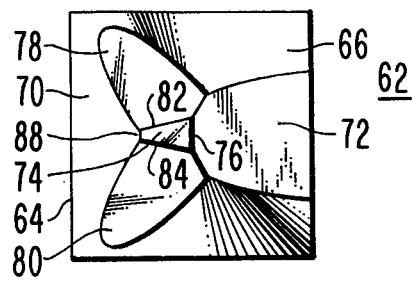

Referring to FIG. 1, there is shown a video disc system 20 which is illustratively of a variable capacitance type as generally shown in the aforesaid Clemens patent. The system 20 includes a turntable 22 rotatably mounted on a base 24 for rotation at a proper playback speed (e.g., 450 rpm). The turntable 22 supports and centers a video disc 26 having information, representative of picture and sound, recorded along a spiral groove disposed on the surface thereof. To obtain adequate playback time, the groove convolutions on the video disc 26 are relatively closely spaced (e.g., groove pitch - 3.5 micrometers). As shown in FIG. 2, the video disc 26 has a dielectric deposit 25 overlying a conductive coating 27 on the video disc substrate 29.

As shown more clearly in FIG. 2, a stylus arm 28 carries at the free end thereof, a groove-engaging pickup stylus 30 which has a novel structure pursuant to the principles of the present invention. The stylus arm 28 is pivotally supported at its remote end to a carriage 32 as shown in FIG. 1. The stylus arm pivot may be of the type disclosed in U.S. Pat. No. 3,917,903 issued to B. K. Taylor, et al.

To enable the pickup stylus 30 to maintain a desired constant attitude in the video disc groove, the carriage 32 is traversed radially of the video disc 26 during playback at a speed suitably synchronized with the rotation of the video disc. The carriage traversing system may be of the type shown in U.S. Pat. No. 3,870,835 issued to F. R. Stave.

As previously indicated, the pickup stylus 30 incorporates a relatively thin electrode (e.g., 0.1250 micrometers deep). The capacitance variations between the stylus electrode and the video disc conductive coating are sensed during playback by a pickup circuit 34. The output of the pickup circuit 34 is processed by a signal processing circuit 36 to a form suitable to be used by a television receiver. The pickup circuit 34 may be of the type illustrated in U.S. Pat. appln. Ser. No. 743,144 of H. Kawamoto, et al., now U.S. Pat. No. 4,080,625. The signal processing circuit 36 may be of the type illustrated in U.S. Pat. No. 3,969,757 issued to J. Amery.

Figure 3:
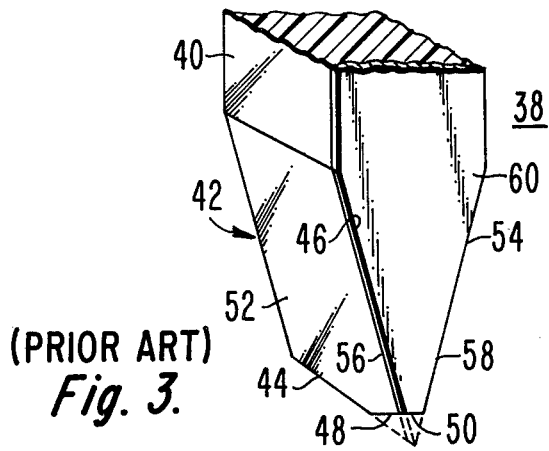
FIG. 3 shows a perspective view of a prior art stylus having a V-shaped tip.

FIG. 3 shows a prior art pickup stylus having a V-shaped tip. The V-tipped pickup stylus 38 includes a sapphire support element 40 which has a V-shaped tip 42. The terminal portion of the V-shaped tip 42 is defined by a prow 44, a substantially flat rear surface 46 remote from the prow, a bottom surface 48 extending from the bottom edge 50 of the rear surface and a pair of side surfaces 52 and 54 extending, respectively, from the side edges 56 and 58 of the rear surface and intersecting at the prow. The intersection of the rear surface 46 and the side surfaces 52 and 54 with the bottom surface 48 defines, for example, a triangular stylus footprint. The entire rear surface 46 of the sapphire support element 40 is coated with conductive material to form a stylus electrode 60.

The use of diamond in place of sapphire for the support element of the video disc player stylus can be expected to increase the life of the stylus. However, the processing of a diamond stylus to obtain desired stylus shape is attended with difficulties due to the shape requirements of the tip, tiny physical dimensions and high hardness of the diamond.

A new system has been conceived, which results in a novel and advantageous stylus shape, and provides a convenient stylus manufacturing method applicable to diamond stylus fabrication.

The novel structure for the diamond stylus will be explained with reference to FIGS. 4-8. FIG. 8 is the perspective view of the new diamond stylus. FIGS. 4-7 are, respectively, the rear view, the end view, the front view and the bottom view of the new diamond stylus.

As shown in these FIGURES, the novel diamond support element 62 has a square post shank 64 which tapers at its one end into a tip. The diamond support element 62 has a plurality of conical portions 66, 68 and 70 in the tip region which have a common axis. The angle subtended by the generating line of the conical portions with the stylus axis is approximately 27.5° in the illustrated embodiment.

Two of the conical portions 66 and 68 are separated by an electrode bearing surface 72. In this particular embodiment, the angle subtended by the electrode bearing surface 72, with the stylus axis is about 37.5°. It is desired that the angle subtended by the electrode bearing surface with the stylus axis be not less than the angle included between the conical surfaces and the stylus axis.

The diamond stylus has in its tip region a record engaging surface 74 which is disposed substantially orthogonal to the electrode bearing surface 72 such that the two surfaces intersect each other along a line 76 perpendicular to the stylus axis. The perpendicular line 76 forms the base of a stylus footprint.

A pair of converging flat surfaces 78 and 80 are provided in the tip region such that the converging flat surfaces intersect with the record engaging surface 74 to define the side edges 82 and 84 of the stylus footprint and such that the intersection of the converging flat surfaces with the conical portion 70 forms a prow 86 remote from the electrode bearing surface 72. The intersection of the prow 86 with the record engaging surface 74 defines the apex 88 of the stylus footprint.

In this particular embodiment, the angle included between the converging flat surfaces 78 and 80 is about 60° and the angle subtended by the converging flat surfaces with the stylus axis is approximately 37.5°. The location of the various surfaces relative to the stylus axis is such that the base dimension of the stylus footprint is 2.5 micrometers and the length of the side edges of the stylus footprint is in the 6–8 micrometer range.

In video disc playback systems wherein recorded information is sensed as variations in capacitance exhibited between a stylus electrode and a conductive coating overlying geometric variations in the disc's groove bottom (for example, the aforesaid Clemens system), a thin layer of conductive material (e.g., 0.1250 micrometers deep) may be deposited on the rear surface 72 of the diamond support element to form a stylus electrode 90, as shown in FIG. 2. The deposition may be made by any known method, such as vacuum evaporation or sputtering.

In accordance with another feature of the invention, the novel diamond stylus is mounted on the stylus arm such that the stylus axis is inclined at an angle of about 52.5° to the record surface (this angle is denoted by the letter δ in FIG. 2). This stylus mounting is in contrast with the conventional stylus mounting where the stylus axis is disposed orthogonal to the record surface. With this inclination of the stylus axis, the stylus electrode 90 is disposed substantially perpendicular to the record surface, since the angle α is 37.5° in this embodiment. With this arrangement, the angle subtended by the prow 86 with the record surface is about 25° (this angle is indicated by the letter γ), because the angle β is made 27.5°. FIG. 2 additionally shows the location of the stylus electrode 90 in relation to the motion of the record 26 which is indicated by the arrow 92.

The stylus tracking force acts on the record surface by being divided into vertical and horizontal components owing to the inclination between the stylus and the record surface. Therefore, the stylus runs smoothly in the groove making fewer stylus chips and increasing the stylus life.

Figure 9:
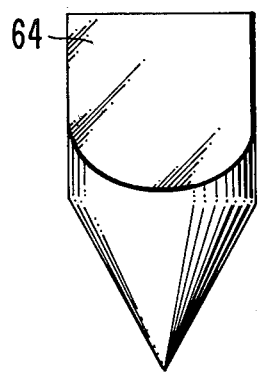
Figure 9A:
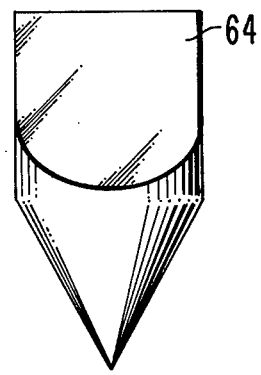
Figure 10:
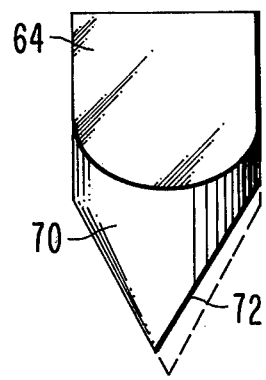
Figure 11:
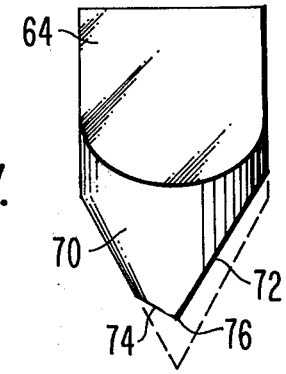

The novel manufacturing method for forming novel diamond stylus will now be described in conjunction with FIGS. 9–11 and 9(a) to 11(a). FIGS. 9–11 show the end views and FIGS. 9(a) to 11(a) show the front views of the diamond support element as it undergoes transformation starting with a square shaped diamond post. The final shape of the novel diamond stylus is shown in FIGS. 4–8.

In the new system, the square post shaped diamond is fixed to a metallic shank under conditions where the axis of the square post is inclined at an angle of approximately 27.5° to the grinding surface, and the diamond, which is being rotated, is ground to form a conical surface on its tip part just as a writing pencil is sharpened. The resulting stylus structure is shown in FIGS. 9 and 9(a).

Figure 10A:
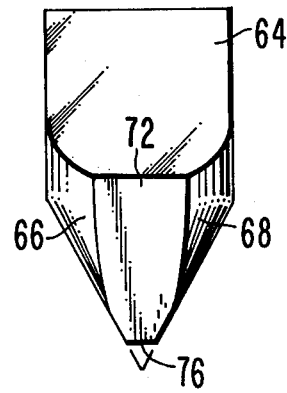

The diamond, with a conical shaped tip, is then held in a fixed position such that a preferred crystal-face can be obtained, and is ground to form an electrode bearing surface 72 such that it subtends an angle of 37.5° with the stylus. The resulting stylus structure is shown in FIGS. 10 and 10(a). Alternately, the electrode bearing surface 72 may be formed such that it is parallel to the generating line of the conical surface.

Figure 11A:
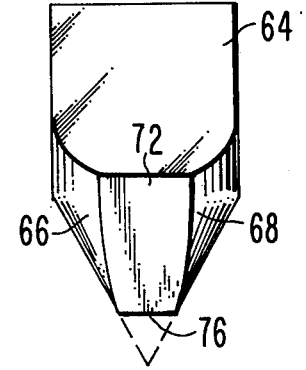

The diamond, with the electrode bearing surface, is then ground crosswise at a right angle to the electrode bearing surface, whereby a horse-shoe-shaped record engaging surface is formed on the bottom of the diamond tip. The resulting stylus structure is shown in FIGS. 11 and 11(a).

Then the diamond tip is ground to form the converging flat surfaces 78 and 80. The resulting stylus structure is shown in FIGS. 4–8.

By using the processing system described above, the tip part of the square post shaped diamond is changed to the conical shape with a record engaging surface at its pointed end. After that, the three sides of the record engaging surface are finished so that the short-side length is approximately 2.5 micrometers to meet the width of the grooves of the video disc, and the long-side length is in the 6–8 micrometer range. The sequence of the above-described steps may be altered without departing from the scope of the invention.

Lastly, after the diamond support element is precisely finished, a metallic coating is deposited by means of vacuum evaporation or sputtering on the electrode bearing surface. Alternatively, the metallic coating may be deposited on the electrode bearing surface immediately after it is formed.

As the above-described process can be performed relatively quickly, the new diamond styli can be manufactured at relatively low cost.

The novel diamond stylus shape in the subject matter of the concurrently filed U.S. Patent application, Ser. No. 830,029, of Y. Matsumoto, entitled, "VIDEO DISC PICKUP APPARATUS."

What is claimed is:

1. A method for forming a pickup stylus for playing back prerecorded signals from a disc record by modifying a stylus element; said method comprising the steps of:
   (A) forming a tip having a conical surface at one end of said stylus element; said conical tip having an axis;
   (B) forming a substantially flat, non-record-engaging surface in the region of said tip;
   (C) forming substantially flat, record-engaging surface substantially orthogonal to said non-record-engaging surface in said tip region such that said flat surfaces intersect each other along a line substantially perpendicular to said axis and forming the base edge of said record-engaging surface; and
   (D) forming a pair of converging, substantially flat surfaces in the region of said tip such that the intersection of said converging flat surfaces with said record-engaging surface defines the sides of said record-engaging surface.

2. A method as defined in claim 1 wherein said stylus element is made from diamond material.

3. A method as defined in claim 1 further including the step of:
   depositing a layer of conductive material on said non-record-engaging surface to form a stylus electrode subsequent to the last mentioned step in claim 1.

4. A method as defined in claim 1 further including an additional step interposed between said flat surface forming steps; said additional step comprising:
   depositing a layer of conductive coating on said non-record-engaging surface to form a stylus electrode.

5. A method as defined in claim 1 wherein said conical surface forming step is performed such that said conical surface subtends an angle of 27.5° with said axis; wherein said non-record-engaging surface forming step serves to establish an angle of 37.5° between said non-record-engaging surface and said axis; and wherein said record-engaging surface forming step serves to establish an angle of 90° between said record-engaging surface and said non-record-engaging surface.

6. A method as defined in claim 1 further including the step of modifying said stylus element to have a square cross-section prior to the first mentioned step in claim 1; wherein said flat surface forming steps are performed such that said base edge of said record-engaging surface is disposed parallel to opposing parallel surfaces of said square cross-section stylus element.

7. A method for forming a stylus by modifying a stylus element; said method including the steps of:
   (A) forming a tip having a conical surface at one end of said stylus element; said conical tip having an axis;
   (B) forming a substantially flat, non-record-engaging surface in the region of said tip;
   (C) forming a substantially flat, record-engaging surface substantially orthogonal to said non-record-engaging surface in said tip region such that said flat surfaces intersect each other along a line substantially perpendicular to said axis and forming the base edge of said record-engaging surface;
   (D) forming a pair of converging, substantially flat surfaces in the region of said tip such that the intersection of said converging flat surfaces with said record-engaging surface defines the sides of said record-engaging surface; and
   (E) depositing a layer of conductive material on said non-record-engaging surface to form a stylus electrode.

8. A method as defined in claim 7 wherein said stylus element is made from diamond material.

9. A method for forming a stylus having a triangular footprint by modifying a stylus element; said method comprising the steps of:
   (A) forming a tip having a conical surface at one end of said stylus element; said conical tip having an axis;
   (B) forming a first flat surface in the region of said tip such that the angle subtended by said first flat surface with said axis is not less than the angle included between said conical surface and said axis;
   (C) forming a second flat surface substantially orthogonal to said first flat surface in said tip region such that said first and said second flat surfaces intersect each other along a line substantially perpendicular to said axis; said perpendicular line forming the base edge of said triangular footprint disposed in the plane of said second flat surface;
   (D) forming a pair of converging flat surfaces in the region of said tip such that the intersection of said converging flat surfaces with said second flat surface defines the sides of said triangular footprint and the intersection of said converging flat surfaces with said conical surface defines the apex of said triangular footprint; and
   (E) depositing a layer of conductive material on said first flat surface to form a stylus electrode.

10. A method for forming a stylus having a triangular footprint by modifying a stylus element; said method comprising the steps of:

(A) forming a tip having a conical surface at one end of said stylus element; said conical tip having an axis;

(B) forming a first flat surface in the region of said tip such that the angle subtended by said first flat surface with said axis is not less than the angle included between said conical surface and said axis;

(C) depositing a layer of conductive coating on said first flat surface to form a stylus electrode;

(D) forming a second flat surface substantially orthogonal to said first flat surface in said tip region such that said first and said second flat surfaces intersect each other along a line substantially perpendicular to said axis; said perpendicular line forming the base edge of said triangular footprint disposed in the plane of said second flat surface; and (E) forming a pair of converging flat surfaces in the region of said tip such that the intersection of said converging flat surfaces with said second flat surface defines the sides of said triangular footprint and the intersection of said converging flat surfaces with said conical surface defines the apex of said triangular footprint.

11. A method as defined in claim 9 wherein said conical surface forming step is performed such that said conical surface subtends an angle of 27.5° with said axis; wherein said first flat surface forming step serves to establish an angle of 37.5° between said first flat surface and said axis; and wherein said second flat surface forming step serves to establish an angle of 90° between said second flat surface and said first flat surface.

12. A method as defined in claim 9 further including the step of modifying said stylus element to have a square cross-section prior to the first mentioned step in claim 10; wherein said first and second flat surface forming steps are performed such that said base edge of said triangular footprint is disposed parallel to opposing parallel surfaces of said square cross-section stylus element.

13. A method as defined in claim 9 wherein said stylus is suitable for playing back prerecorded signals from a disc record track of a given width when stylus/record relative motion is established; wherein said step of forming said converging flat surfaces is performed such that the maximum separation between said sides of said triangular footprint is less than said given track width.

* * * * *